Sept. 7, 1954 K. B. SORENSEN ET AL 2,688,222
ADJUSTABLY MOUNTED BEET HARVESTER
Filed April 5, 1952 4 Sheets-Sheet 1

INVENTORS.
KNUD B. SORENSEN
HOWARD F. CLAUSEN
BY
C.T. Parker & R.C. Johnson
ATTORNEYS

INVENTORS
KNUD B. SORENSEN
HOWARD F. CLAUSEN

Sept. 7, 1954 K. B. SORENSEN ET AL 2,688,222
ADJUSTABLY MOUNTED BEET HARVESTER
Filed April 5, 1952 4 Sheets-Sheet 4

INVENTORS.
KNUD B. SORENSEN
HOWARD F. CLAUSEN
BY
ATTORNEYS

Patented Sept. 7, 1954

2,688,222

UNITED STATES PATENT OFFICE 2,688,222

ADJUSTABLY MOUNTED BEET HARVESTER

Knud B. Sorensen, Rock Island, and Howard F. Clausen, Moline, Ill., assignors to Deere & Company, Moline, Ill., a corporation of Illinois Application April 5, 1952, Serial No. 280,764

8 Claims. (Cl. 55—108)

1

The present invention relates generally to agricultural implements and more particularly to beet harvesters.

The object and general nature of the present invention is the provision of a beet harvester having new and improved means for raising and lowering the beet digging elements and particularly arranged and constructed to withstand the relatively large forces involved in loosening the ground surrounding the beets, raising them out of the ground, and directing them toward a point of discharge, all of which is performed at a relatively high rate of ground travel, as required by modern tractor farming operations.

It is a further feature of this invention to provide new and improved means for driving certain parts of the harvester irrespective of different operating positions of the beet-engaging and digging elements.

These and other objects and advantages will be apparent to those skilled in the art after a consideration of the following detailed description of the preferred embodiment, illustrated in the accompanying drawings in which.

Figure 1:
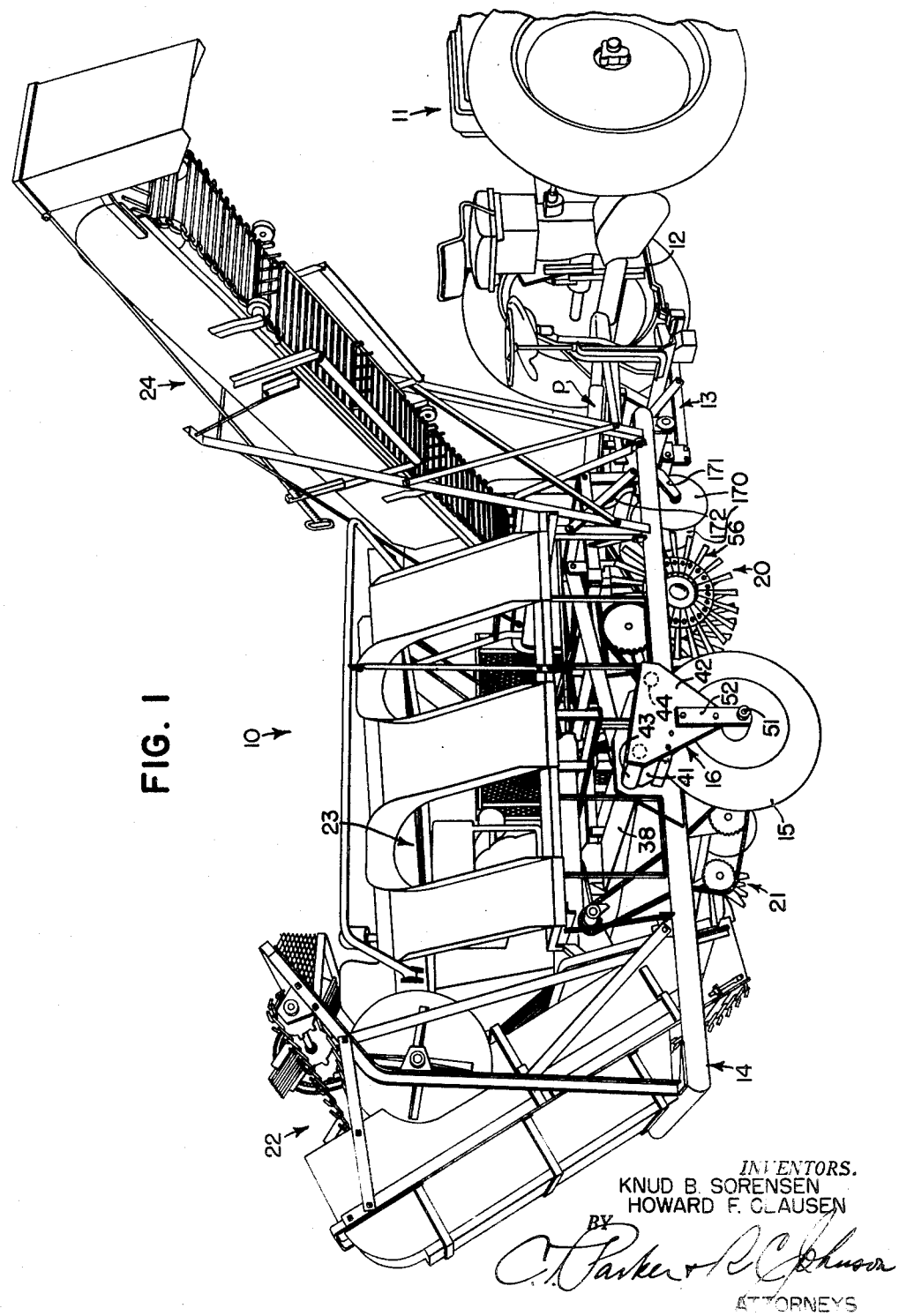
Figure 1 is a perspective view of a beet harvester in which the principles of the present invention have been incorporated.

Referring now first to Figure 1, the beet harvester, which is indicated in its entirety by the reference numeral 10, is shown as a two-wheel supported cart-like structure propelled by and supported at its front end on a farm tractor 11. The latter is generally of conventional construction and embodies a drawbar 12 to which the front end of the harvester is connected, as by a hitch structure 13 that is rigidly connected with the front portion of the main frame 14 of the harvester. The supporting wheels of the harvester are indicated at 15 and are carried in a wheel frame and spindle assembly 16 that is arranged to be adjustable laterally relative to the main frame 14. The supporting wheels 15

2 are arranged generally midway between the front and rear ends of the harvester frame 14.

The beet harvester 10 preferably is constructed and arranged as a two-row machine and includes a beet digging unit 20, and a conveyor and cleaning unit indicated generally at 21, a rear elevator unit 22 that delivers the beets onto a forwardly moving sorting belt 23, and a truck elevator unit 24 that receives the beets from the sorting belt and delivers them laterally outwardly and upwardly to a point of discharge from which the beets drop into a truck, trailer or the like driven alongside the harvester in operation. The present invention is particularly concerned with the beet digging unit 20, particularly the framework and associated parts by which the digging elements are supported, and raised and lowered, and a detailed description of the various parts of the beet digging unit 20 appears below.

Figure 2:
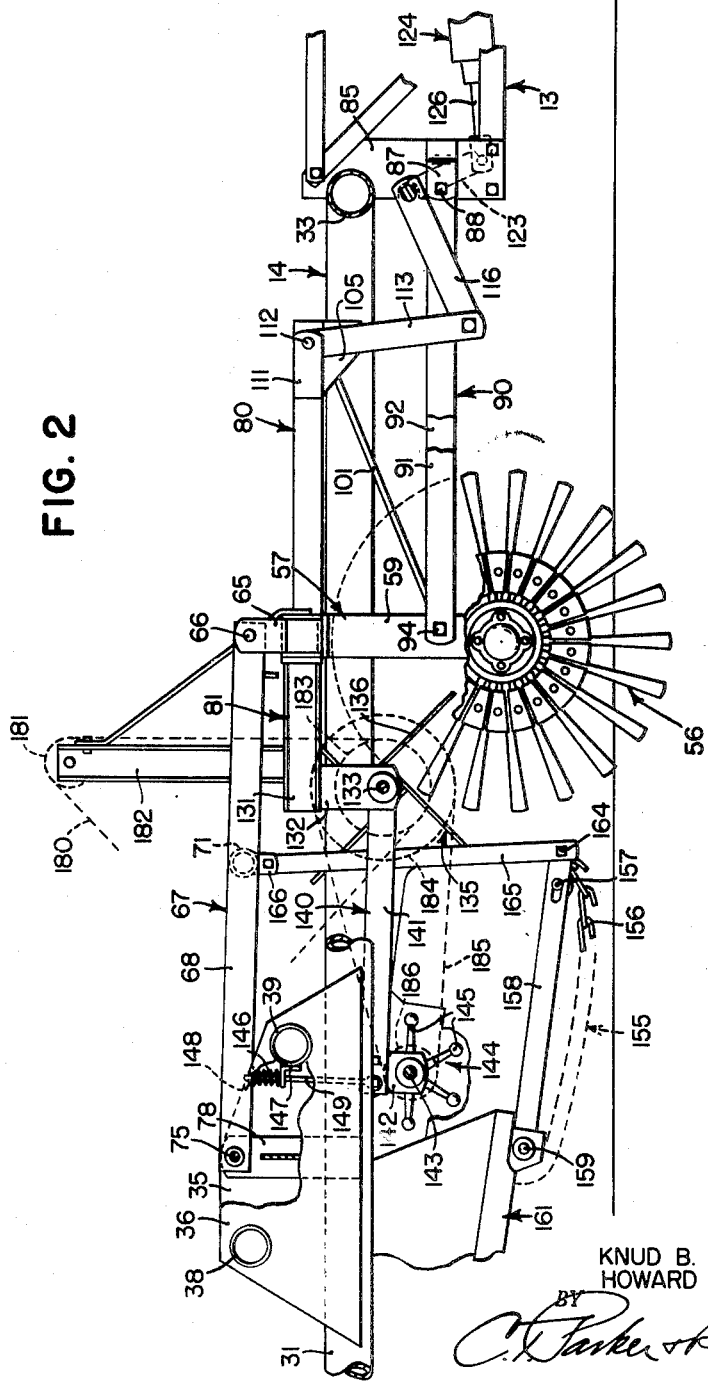
Figure 2 is an enlarged side view, with certain portions broken away, showing the details of digger-supporting structure and associated parts.
Figure 3:
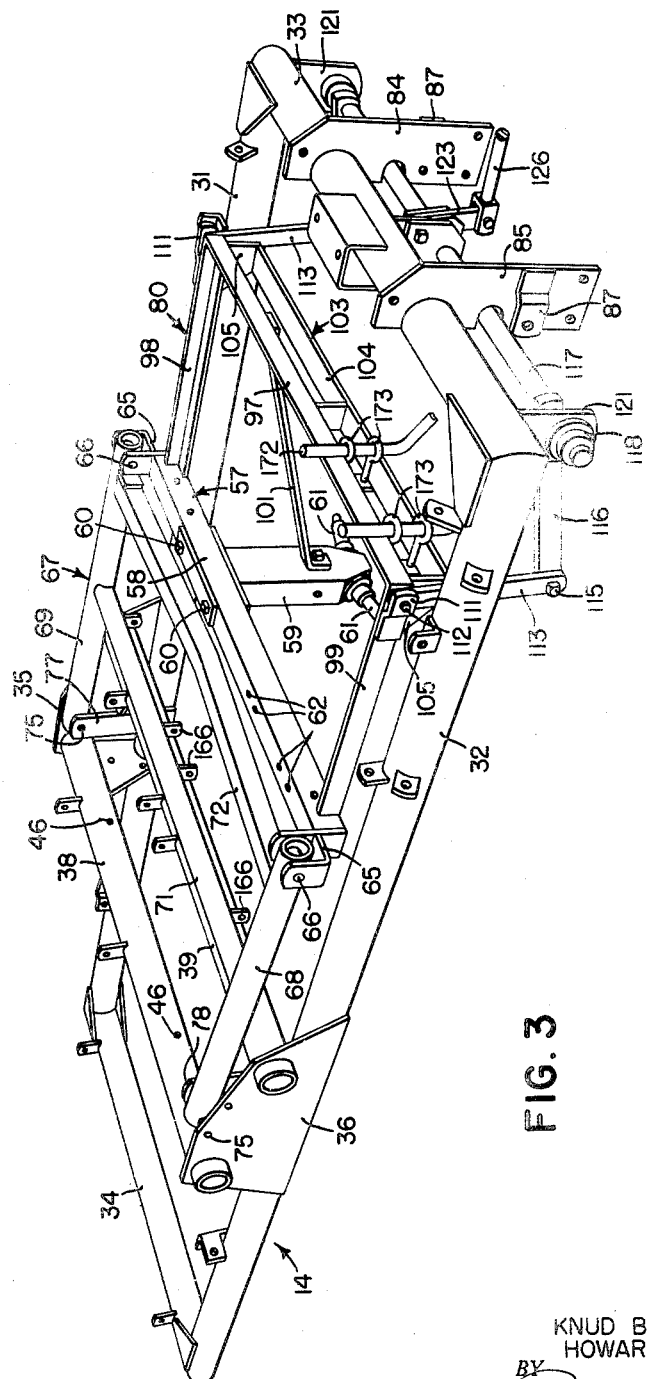
Figure 3 is a further enlarged fragmentary perspective showing the principal portions of the frame structure and the compression and tension link means connecting the digger-supporting structure with the harvester frame structure.
Figure 4:
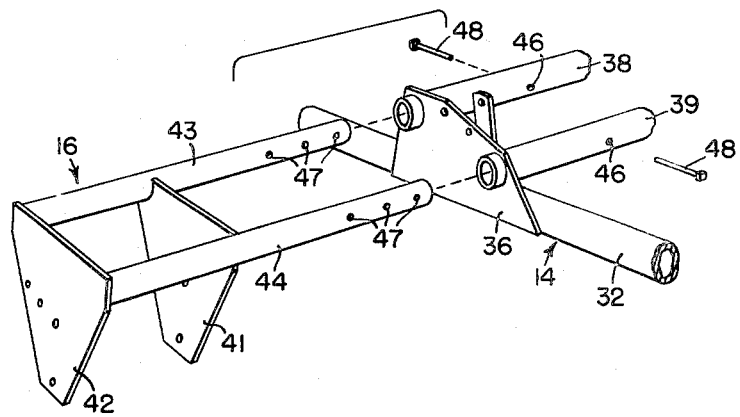
Figure 4 is a fragmentary detail view showing the adjustable supporting wheel mounting.
Figure 5:
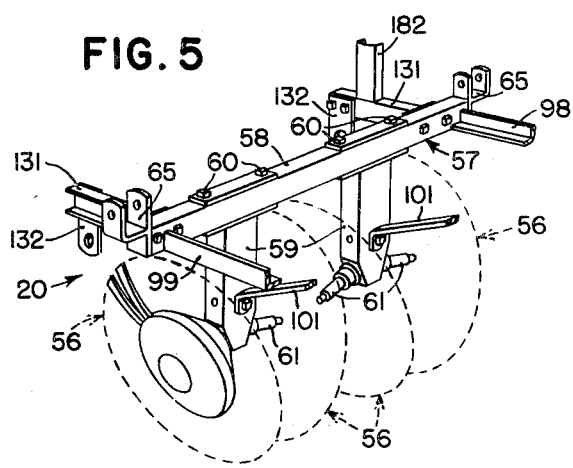
Figure 5 is a fragmentary perspective view, similar to Figure 3, showing the two pairs of digger wheels and associated parts.

Referring now more particularly to Figures 2 and 3, the main frame 14 comprises generally fore-and-aft extending frame bars, preferably in the form of pipe members 31 and 32, arranged in laterally spaced apart relation. To the forward ends of the frame members 31 and 32 is secured a cross frame member in the form of a tube or pipe 33. A similar pipe member 34 connects the rear ends of the fore-and-aft extending frame members 31 and 32, the parts being rigidly interconnected, as by welds, together with suitable reenforcing gussets and the like. A pair of vertical generally fore-and-aft extending plates 35 and 36 are secured, as by welding, to the frame members 31 and 32 at the outer sides thereof, and these brackets or plates are apertured to receive a pair of transverse pipe members 38 and 39, which are securely welded or otherwise fixed to the bracket plates 35 and 36. As indicated in Figure 1, each of the supporting wheels 15 is journaled for rotation in a wheel frame 16 that comprises a pair of laterally spaced apart plates 41 and 42 that are securely fixed, as by welding, to the laterally outer end portions of a pair of tubular members 43 and 44, the laterally inner end portions of which are adapted to be received in the adjacent ends of the main frame cross pipes 38 and 39. The members 38 and 39 are provided with apertures 46, as best shown in Figure 3, and, as best shown in Figure 4, the wheel frame members 43 and 44 are provided with a plurality of apertures 47, which, with associated pins or bolts 48, provide for securing the wheel frames 16 rigidly to the main frame 14 in different positions of lateral adjustment. In each of the wheel frame and spindle units 16, a wheel axle or spindle 51 is carried by the associated plates 41 and 42 through suitable spindle brackets 52.

The beet digging unit 20 includes a plurality of spike wheels 56, there preferably being two wheels for each row of beets to be dug, and these wheels are mounted for free rotation on a generally transverse, vertically disposed digger-supporting structure 57. This structure includes a transverse member 58, which may be a square tube or the like, and a pair of depending shanks or standards 59 rigidly secured at their upper ends to the transverse member 58, preferably by a plurality of bolts 60 secured in different laterally spaced openings 62 in the member 58 which thereby provide for arranging the shanks or standards 59 in different lateral spacings. The lower portion of each of the shanks or standards 59 carries laterally outwardly and downwardly extending spindles 61 on which the digger wheels 56 are mounted for rotation. A bifurcated bracket structure 65 is fixed to each end of the transverse member 58 and is apertured to receive a pin 66 by which front portions of a generally horizontally disposed link means 67 is connected with the digger-supporting structure 57.

The link means 67 preferably is in the form of a stabilizing frame having sufficient rigidity to resist torsional and lateral deflection and comprises right- and left-hand side members 68 and 69, preferably in the form of pipes, tubes or the like, rigidly interconnected by cross members 71 and 72 securely fixed, as by welding, to the pipe members 68 and 69. The forward ends of the pipe members 68 and 69 are apertured to receive the pins 66, and the rear ends of the pipe members 68 and 69 are apertured to receive a second set of pivot pins 75 by which the frame 67 is pivotally connected with the main frame 14 of the harvester, as through the bracket plates 35 and 36, and associated auxiliary brackets 77 and 78. The frame maintains the vertically disposed, transversely extending digger-supporting structure 57 in a position generally between the laterally spaced apart main frame members 31 and 32. The digger-supporting structure 57 also includes a forward frame extension 80 and a rearward frame extension 81, disposed generally in the same horizontal plane, and will be referred to later in detail.

Secured to the front main cross frame member 33 is a pair of depending brackets 84 and 85, each welded at its upper end to the front cross frame member 33 in laterally spaced apart relation. A hammer strap 87 is securely fixed, as by welding, to the lower portion of each of the brackets 84 and 85, and each hammer strap, together with portions of the associated depending bracket, is apertured to receive a pivot 88 by which the front end of a tension link member 90 is pivotally connected therewith. Each tension link 90 includes a pair of bars 91 and 92, and these bars are disposed in laterally spaced apart relation at their rear ends, embracing the lower portions of the associated digger wheel shank or standard 59 and pivotally connected therewith, as by a pivot bolt 94, which passes through apertures in the bars 91 and 92 and an aperture in the associated shank 59. As will best be seen from Figure 2, the tension link members 90, there being one for each of the shanks 59, are disposed in a generally horizontal plane that is substantially parallel, when the digger wheels are in operation, to the horizontal plane of the horizontal link means or stabilizing frame 67.

The forward extension 80 of the digger-supporting frame 57 comprises a front angle 97 and side angles 98 and 99, the rear ends of the latter being secured, as by welding, to the crossbar 58, as best shown in Figure 3. A pair of braces 101 are fixed at their rear and lower ends to the lower portions of the digger wheel shanks 59 and at their upper forward ends to the extension frame angle 97. The latter forms a part of a crossbar structure 103 which includes, in addition to the angle 97, a lower member 104 and depending brackets 105 that secure the ends of the lower bar 104 to the forward ends of the side angles 98 and 99. Hammer straps 111 are fixed to the forward ends of the side angles 98 and 99, these portions being apertured to receive pivot pin means 112 by which the upper ends of a pair of lift links 113 are pivotally connected with the digger-supporting frame 57 through the forwardly extending frame section 80. The lower ends of the links 113 are apertured to receive pivots 115 by which the links 113 are connected to arms 116 fixed to a forward cross shaft 117. The latter is supported for rocking movement through suitable bearing means 118 in a pair of depending brackets 121. An arm 123 is connected in any suitable way with the cross shaft 117 and is arranged to be operated by a hydraulic cylinder 124 that is supported at its front end on the front portion of the hitch structure 13 and which includes a piston rod 126 pivotally connected to the lower end of the arm 123. The latter member, together with the shaft 117 and arms 116, constitutes a power-operated bell crank which, acting through the links 113, serves to raise and lower the digger-supporting structure 57, and since the rear link means or frame 67 and the forward link means 90 are disposed in substantial parallelism, as shown in Figure 2, the digger-supporting structure 57 is moved directly vertically in different parallel positions.

The rear frame extension 81 of the digger-supporting structure 57 comprises a pair of rearwardly extending channels 131 rigidly secured in any suitable way to the rear side of the cross member 58. Each of the short channels 131 has fixed to the rear end thereof a depending bearing bracket 132 in which a cross shaft 133 is journaled for rotation. A plurality of paddle wheel elements 135 are fixed in any suitable way to the shaft 133, each of the elements 135 including a plurality of beet-engaging blades 136 arranged as best shown in Figure 2. The shaft 133 also supports the forward end of a cleaner frame 140 that includes a pair of bars 141 supported at their forward ends through suitable bearing means on the shaft 133. The rear ends of the two bars 141 are apertured to receive cleaner bearing brackets 142 in which a cross shaft 143 is received. Secured in any suitable way to the shaft 143 is a plurality of rotors 144, each of which is provided with a plurality of radially extending fingers 145, preferably of rubber. Only one rotor 144 appears in Figure 2 because the others are disposed directly behind the one appearing in Figure 2. The rear end of the cleaner frame is supported by a pair of adjustable eye bolts or supporting rods 149, the lower ends of which are connected in any suitable way with the cleaner frame bars 141 and at their upper ends the rods 149 are extended through cushioning springs 146 carried by brackets 147 fixed to the transverse frame pipe 39. The upper ends of the bolts or rods 145 are threaded to receive adjusting nuts 146, and by turning the latter the rear end of the cleaner frame 140 may be raised or lowered relative to the main frame 14. It is to be noted that the cleaning rotor 144 is disposed substantially directly below the supporting members 149, whereby vertical movement of the digger-supporting frame 57, together with the beet-engaging paddle wheels 135 and the forward portions of the cleaner frame bars 141, does not change the position of the rotors 144 with respect to the harvester frame.

A lower conveyor 155 is supported generally underneath the paddle wheels 135 and the cleaning rotors 144. The conveyor 155 includes a conveyor chain 156 mounted on front rollers supported on a shaft 157, the latter being supported at the front portions of a pair of generally fore-and-aft extending bars 158, the rear ends of the latter being mounted for rocking movement on a shaft 159. The shaft 159 is carried by any suitable means, such as a bracket structure 161 fixed directly to the main frame 14 of the harvester. For raising and lowering the front end of the conveyor 155 when the digger-supporting structure 57 is raised and lowered, the front ends of the bars 158 are pivotally connected, as at 164, to the lower ends of a pair of lift bars 165, the upper ends of which are pivotally connected to lugs 166 fixed, as by welding, to the lower side of the crossbar 71.

A plurality of colters 170, each rotatably mounted in a colter yoke 171 connected to the lower end of a colter shank 172, are disposed in front of the beet digging units 20. The upper portions of the several colter shanks 172, there preferably being four in number as best shown in Figure 3, are connected by suitable clamps 173 with the front crossbar structure 103 of the frame extension 80. The clamps 173 and the colters 170 may be arranged as desired, there preferably being a pair of colters for each row of beets to be harvested. The colters are raised and lowered directly with the raising and lowering of the digger wheels 56.

The main frame 14 carries a power shaft P, Figure 1, by which a drive chain 180 is driven. The chain 180 is trained over a sprocket 181 carried at the upper end of an upright 182 fixed to the rear extension frame 81 of the digger frame 57. The lower portion of the drive chain 180 is trained over a sprocket 183 secured to the paddle wheel shaft 133, whereby the latter and the paddle wheel elements 135 are driven. A sprocket 184 is fixed to the paddle wheel shaft 133 and drives the beater cross shaft 143 through a drive chain 185 and a sprocket 186. Since the drive chains 180 and 185, and associated sprockets 181, 183, 184 and 186, are conventional it suffices to show these parts diagrammatically in Figure 2. No claim is made in this application to the aforesaid drive chains and sprockets. As will be seen from Figure 2, the arrangement is such that by virtue of the bars 141, up-and-down movement of the digger frame 57 does not materially disturb the drive between the sprocket 184 and the sprocket 186 on the cleaner wheel shaft 143.

In operation, as the machine is propelled forwardly (toward the right as viewed in Figures 1 and 2) the lower links 90 act in tension to pull the digging wheels through the soil. Since the links 90 are connected with the wheel-supporting shanks or standards 59 at points above the spindles 61, the tension forces tend to swing the upper portion of the digger supporting structure 57 forwardly, which is resisted by the link means 67 acting mainly in tension. Thus, with the principal members acting in tension, structural shapes, smaller than would be adequate if they were called upon to act in compression, provide sufficient strength to sustain the forces involved in digging beets.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. In a beet harvester, a generally horizontal main frame, generally upright digger-supporting structure, soil-entering digging means carried by said structure adjacent its lower end, generally horizontal fore-and-aft extending tension link means pivotally connected at its rear end to the lower portion of said digger-supporting structure above said digging means, means pivotally connecting the front end of said tension link means with the forward portion of said main frame, generally horizontal fore-and-aft extending link means pivotally connected at its forward end to the upper portion of said digger-supporting structure above said tension link means and acting in tension between the upper portion of said digger-supporting structure and said main frame when soil pressure acts against said digging means, means pivotally connecting the rear end of said last mentioned link means with said main frame, and means reacting between said main frame and said digger-supporting structure for raising and lowering the latter.

2. The invention as defined in claim 1, further characterized by said two link means being disposed in substantially parallel horizontal planes in a working position.

3. In a beet harvester, a generally horizontal main frame including a pair of laterally spaced, fore-and-aft extending frame bars, a generally vertically disposed digger-supporting structure disposed in a position between said frame bars, a rigid stabilizing frame pivotally connected at its rear end with said frame bars and at its forward end with laterally spaced points of said digger-supporting structure adjacent the upper portion thereof, a pair of depending brackets fixed rigidly to the front end of said main frame and disposed in laterally spaced apart relation, ground-entering digging means connected with the lower portion of said digger-supporting structure, and a pair of tension links pivotally connected at their forward ends with said depending brackets, respectively, and with the lower portions of said digger-supporting structure above said digging means, whereby the digger-supporting structure is held in position by said stabilizing frame and said tension links but is capable of shifting in a generally vertical direction relative to said main frame.

4. The invention set forth in claim 3, further characterized by said digger-supporting structure including a forwardly disposed extension fixed rigidly to the upper portion of said digger-supporting structure, and means connected with the forward portion of said extension for raising and lowering said digger-supporting structure.

5. In a beet harvester, a main frame including front cross members and a pair of generally fore-and-aft extending members spaced apart laterally, a pair of upstanding brackets carried by said members adjacent the rear ends thereof, a laterally rigid stabilizing frame, comprising a pair of side members and cross members rigidly interconnecting said side members, means for pivotally connecting the rear ends of said side members with said upstanding brackets on the main frame, a digger-supporting structure comprising a transverse member and a pair of generally vertical digger wheel shanks rigidly connected at their upper ends to said transverse member, means pivotally connecting the forward ends of said side members with said last mentioned transverse member, draft links connecting the front portions of said main frame with the lower portions of said digger wheel shanks, a frame extension rigidly fixed at its rear end to the forward side of said digger frame transverse member, and means acting between the front portion of said extension and said main frame for raising and lowering said digger-supporting structure.

6. In a beet harvester including a main frame, a digger-supporting structure, comprising a transverse member, a pair of shanks fixed at their upper ends to said member, a pair of frame means extending, respectively, fore and aft of said member from the upper portion of said digger-supporting structure, digging means carried at the lower ends of said shanks, means on the main frame connected with the forward portion of the forwardly extending frame means for raising and lowering said digger-supporting structure, and a beet-engaging member rotatably mounted on the rear end of the rearwardly extending frame means and rearwardly and upwardly of said digging means.

7. In a beet harvester, a main frame, a laterally rigid stabilizing frame, comprising a pair of side members and cross members rigidly interconnecting said side members, means pivotally connecting the rear ends of said side members with said main frame, a digger-supporting structure comprising a transverse member and a pair of generally vertical digger wheel shanks rigidly connected at their upper ends to said transverse member, means pivotally connecting the forward ends of said side members with said last mentioned transverse member, draft links connecting the front portions of said main frame with the lower portions of said digger wheel shanks, a frame extension rigidly fixed at its rear end to the forward side of said digger frame transverse member, and means acting between the front portion of said extension and said main frame for raising and lowering said digger-supporting structure.

8. The invention set forth in claim 7, further characterized by a second frame extension fixed rigidly at its forward end to the rear side of said digger transverse member and extending rearwardly therefrom, depending bearing bracket means fixed to said rearwardly extending frame extension rearwardly of said digger wheel shanks, and beet-engaging means rotatably carried by said bracket means.

References Cited in the file of this patent

UNITED STATES PATENTS

| Number | Name | Date |
| --- | --- | --- |
| 840,482 | Dusseau | Jan. 8, 1907 |
| 2,087,402 | Geibig | July 20, 1937 |
| 2,350,173 | Loucks et al. | May 30, 1944 |
| 2,535,960 | Schmidt | Dec. 26, 1950 |
| 2,582,945 | Bingham et al. | Jan. 22, 1952 |